(12) United States Patent
Meehan

(10) Patent No.: US 9,453,503 B2
(45) Date of Patent: Sep. 27, 2016

(54) METHOD FOR OBTAINING A FULL RANGE OF LIFT SPEEDS USING A SINGLE INPUT

(71) Applicant: Eaton Corporation, Cleveland, OH (US)

(72) Inventor: Timothy I. Meehan, Waconia, MN (US)

(73) Assignee: Eaton Corporation, Cleveland, OH (US)

( * ) Notice: Subject to any disclaimer, the term of this patent is extended or adjusted under 35 U.S.C. 154(b) by 470 days.

(21) Appl. No.: 13/737,381

(22) Filed: Jan. 9, 2013

(65) Prior Publication Data

US 2013/0195681 A1 Aug. 1, 2013

Related U.S. Application Data

(60) Provisional application No. 61/584,630, filed on Jan. 9, 2012, provisional application No. 61/584,650, filed on Jan. 9, 2012.

(51) Int. Cl.
*E02F 9/22* (2006.01)
*F04B 17/05* (2006.01)
(Continued)

(52) U.S. Cl.
CPC ............... *F04B 17/05* (2013.01); *B60K 6/12* (2013.01); *B66F 9/07572* (2013.01); *E02F 9/2217* (2013.01); *E02F 9/2253* (2013.01); *E02F 9/2282* (2013.01); *E02F 9/2289* (2013.01); *E02F 9/2292* (2013.01);
(Continued)

(58) Field of Classification Search
CPC ............. F16H 61/4078; F16H 61/472; E02F 9/2246; F04B 49/20; F04B 49/08; F04B 49/00; F04B 49/065; F15B 2211/633; F15B 2211/6336; F15B 2211/63363
See application file for complete search history.

(56) References Cited

U.S. PATENT DOCUMENTS

| 3,238,722 A | 3/1966 | Berkman et al. |
| 4,778,020 A | 10/1988 | Hagin et al. |

(Continued)

FOREIGN PATENT DOCUMENTS

| CN | 1347818 A | 5/2002 |
| CN | 101657646 A | 2/2010 |

(Continued)

OTHER PUBLICATIONS

Invitation to Pay Additional Fees with Partial International Search for PCT/US2013/020839 mailed Apr. 24, 2013.

(Continued)

*Primary Examiner* — Nathaniel Wiehe
*Assistant Examiner* — Abiy Teka
(74) *Attorney, Agent, or Firm* — Merchant & Gould P.C.

(57) ABSTRACT

A method for operating a work attachment of a work machine with a single input is disclosed. In one step of the method, an indication is received that operation of a work circuit in a hydraulic system is to be activated. Upon this indication, the hydraulic system may be placed in a work circuit primary mode in which a pump is placed in fluid communication with the work circuit. The method also includes receiving a lifting lever position and correlating the lifting lever position to a required lifting speed. The method further includes automatically controlling at least two of an engine speed, a pump displacement, and a lifting control valve to satisfy the required lifting speed. Additionally, the operation of the engine speed, pump displacement and lifting control valve may be sequentially staged in predefined zones of operation.

13 Claims, 13 Drawing Sheets

(51) Int. Cl.
*F04B 49/00* (2006.01)
*F15B 21/14* (2006.01)
*B66F 9/075* (2006.01)
*F15B 1/02* (2006.01)
*B60K 6/12* (2006.01)
*F16H 61/4078* (2010.01)
*F16H 61/4096* (2010.01)

(52) U.S. Cl.
CPC ............ *E02F 9/2296* (2013.01); *F04B 49/00* (2013.01); *F15B 1/02* (2013.01); *F15B 21/14* (2013.01); *F16H 61/4078* (2013.01); *F16H 61/4096* (2013.01); *F15B 2211/20523* (2013.01); *F15B 2211/20546* (2013.01); *F15B 2211/20561* (2013.01); *F15B 2211/20569* (2013.01); *F15B 2211/212* (2013.01); *F15B 2211/633* (2013.01); *F15B 2211/6309* (2013.01); *F15B 2211/6313* (2013.01); *F15B 2211/6333* (2013.01); *F15B 2211/6336* (2013.01); *F15B 2211/6343* (2013.01); *F15B 2211/6346* (2013.01); *F15B 2211/7135* (2013.01); *F15B 2211/88* (2013.01); *Y02T 10/6208* (2013.01)

(56) References Cited

U.S. PATENT DOCUMENTS

| | | | |
|---|---|---|---|
| 5,495,912 | A | 3/1996 | Gray, Jr. et al. |
| 5,505,527 | A | 4/1996 | Gray, Jr. et al. |
| 5,887,674 | A | 3/1999 | Gray, Jr. |
| 6,047,545 | A | 4/2000 | Deininger |
| 6,170,587 | B1 | 1/2001 | Bullock |
| 6,305,162 | B1* | 10/2001 | Cobo et al. ............ 60/422 |
| 6,619,325 | B2 | 9/2003 | Gray, Jr. |
| 6,719,080 | B1 | 4/2004 | Gray, Jr. |
| 6,840,334 | B2 | 1/2005 | Marquardt |
| 6,876,098 | B1 | 4/2005 | Gray, Jr. |
| 6,996,982 | B2 | 2/2006 | Gray, Jr. |
| 6,998,727 | B2 | 2/2006 | Gray, Jr. |
| 7,014,429 | B2 | 3/2006 | Gray, Jr. et al. |
| 7,108,016 | B2 | 9/2006 | Moskalik et al. |
| 7,121,304 | B2 | 10/2006 | Gray, Jr. |
| 7,252,020 | B2 | 8/2007 | Gray, Jr. et al. |
| 7,305,914 | B2 | 12/2007 | Gray, Jr. |
| 7,305,915 | B2 | 12/2007 | Gray, Jr. |
| 7,337,869 | B2 | 3/2008 | Gray, Jr. et al. |
| 7,374,005 | B2 | 5/2008 | Gray, Jr. |
| 7,456,509 | B2 | 11/2008 | Gray, Jr. |
| 7,500,424 | B2 | 3/2009 | Gray, Jr. et al. |
| 7,527,074 | B1 | 5/2009 | Gray, Jr. |
| 7,537,075 | B2 | 5/2009 | Gray, Jr. et al. |
| 7,553,085 | B2 | 6/2009 | Gray, Jr. |
| 7,594,802 | B2 | 9/2009 | Gray, Jr. |
| 7,617,761 | B2 | 11/2009 | Gray, Jr. |
| 7,677,871 | B2 | 3/2010 | Gray et al. |
| 7,770,697 | B2* | 8/2010 | Futahashi et al. ............ 187/224 |
| 7,857,082 | B2 | 12/2010 | Gray, Jr. |
| 7,984,783 | B2 | 7/2011 | Gray, Jr. et al. |
| 7,987,940 | B2 | 8/2011 | Bryson et al. |
| 8,020,587 | B2 | 9/2011 | Gray, Jr. |
| 8,052,116 | B2 | 11/2011 | Gray, Jr. |
| 8,087,733 | B2 | 1/2012 | Fouquet et al. |
| 8,100,221 | B2 | 1/2012 | Stuhldreher et al. |
| 8,177,009 | B2 | 5/2012 | Gray, Jr. |
| 8,297,198 | B2 | 10/2012 | Read |
| 8,306,682 | B2 | 11/2012 | Gray, Jr. |
| 8,356,547 | B2 | 1/2013 | Gray, Jr. |
| 8,356,985 | B2 | 1/2013 | Gray. Jr. et al. |
| 8,375,982 | B2 | 2/2013 | Gray, Jr. |
| 8,381,851 | B2 | 2/2013 | Gray, Jr. |
| 2001/0030085 | A1* | 10/2001 | Nagata et al. ............ 187/222 |
| 2005/0042121 | A1 | 2/2005 | Suzuki et al. |
| 2005/0246082 | A1 | 11/2005 | Miki et al. |
| 2006/0051216 | A1 | 3/2006 | Gray et al. |
| 2007/0095547 | A1 | 5/2007 | Moore |
| 2008/0135325 | A1 | 6/2008 | Stuhldreher et al. |
| 2009/0145120 | A1* | 6/2009 | Esders et al. ............ 60/422 |
| 2009/0210120 | A1 | 8/2009 | Stein et al. |
| 2010/0186408 | A1 | 7/2010 | Rose et al. |
| 2011/0030364 | A1 | 2/2011 | Persson et al. |
| 2011/0071716 | A1 | 3/2011 | Gray, Jr. |
| 2011/0073191 | A1 | 3/2011 | Gray, Jr. |
| 2011/0153129 | A1 | 6/2011 | Gray, Jr. |
| 2012/0324879 | A1 | 12/2012 | Haugen |
| 2013/0149093 | A1 | 6/2013 | Kaneko et al. |
| 2013/0280111 | A1 | 10/2013 | Hoxie et al. |

FOREIGN PATENT DOCUMENTS

| | | |
|---|---|---|
| DE | 198 34 765 A1 | 2/2000 |
| DE | 101 28 582 A1 | 12/2002 |
| DE | 101 51 831 A1 | 5/2003 |
| DE | 10 2008 021 8 | 11/2009 |
| DE | 10 2010 010 4 | 9/2011 |
| EP | 0 140 046 B1 | 4/1987 |
| EP | 2 071 196 A1 | 6/2009 |
| JP | 2001-97693 | 4/2001 |
| WO | WO 2009/006201 A2 | 1/2009 |
| WO | WO 2015/171692 A1 | 11/2015 |

OTHER PUBLICATIONS

International Search Report and Written Opinion for PCT/US2013/020839 mailed Jul. 29, 2013.
Hydraulic Hybrid Research, http://www.epa.gov/otaq/technology/research/research-hhvs.htm, 3 pages (Date Printed Jan. 4, 2012).
PCT Patent Application No. PCT/US2015/057398 filed Oct. 26, 2015.
U.S. Appl. No. 61/326,317 entitled "Methods for Safe Operation of Hydraulic Hybrid Vehicles with Over-Center Pump/Motors".

* cited by examiner

Flow Condition – Lift Speed Map

Lever Position – Lift Speed Map

US 9,453,503 B2

METHOD FOR OBTAINING A FULL RANGE OF LIFT SPEEDS USING A SINGLE INPUT

CROSS-REFERENCES TO RELATED APPLICATION

The present application claims priority to U.S. Provisional Patent Application Ser. No. 61/584,630, filed Jan. 9, 2012, which is incorporated herein by reference in its entirety, and the present application also claims priority to U.S. Provisional Patent Application Ser. No. 61/584,650, filed Jan. 9, 2012, which is incorporated herein by reference in its entirety. The present patent application also relates to U.S. patent application Ser. No. 13/737,679, entitled "PROPEL CIRCUIT AND WORK CIRCUIT COMBINATIONS FOR A WORK MACHINE", filed Jan. 9, 2013, which application is hereby incorporated by reference in its entirety.

BACKGROUND

Work machines, such as fork lifts, wheel loaders, track loaders, excavators, backhoes, bull dozers, and telehandlers are known. Work machines can be used to move material, such as pallets, dirt, and/or debris. The work machines typically include a work implement (e.g., a fork) connected to the work machine. The work implements attached to the work machines are typically powered by a hydraulic system. The hydraulic system can include a hydraulic pump that is powered by a prime mover, such as a diesel engine. The work implement, such as the forks on a fork lift, are typically raised and lowered by the operation of a lever which activates one or more hydraulic cylinders via a control valve. Although the number of cylinders can vary, they most typically number between one and three for such an application. While the flow through the control valve is a function of the lever position, flow is also significantly influenced by the hydraulic system pump speed and the displacement of the pump. The pump is typically coupled to the engine of the fork lift. Accordingly, maximum lifting speed and force are attained when the control valve is fully open and the pump is at a maximum speed and displacement. In many systems, this condition can only be achieved when an operator moves the lever to the maximum position while depressing the engine accelerator to increase pump speed. Because this action may cause the fork lift drive system to propel the vehicle, the operator may also be required to depress the brake pedal or clutch pedal in order to remain stationary. As such, a fork lift machine may require an operator to simultaneously operate three separate inputs in order to obtain maximum lifting capabilities. Improvements are desired.

SUMMARY

A method for operating a work attachment of a work machine with a single input is disclosed. In one step of the method, an indication is received that operation of a work circuit in a hydraulic system associated with the work attachment is to be activated. Upon this indication, the hydraulic system may be placed in a work circuit primary mode in which a pump in the hydraulic system is placed in fluid communication with the work circuit and in which the pump is isolated from a drive circuit of the hydraulic system. The method also includes receiving a lifting lever position and correlating the lifting lever position to a required lifting speed. The method further includes automatically controlling at least two of an engine speed, a pump displacement, and a lifting control valve to satisfy the required lifting speed.

The method may also include correlating the required lifting speed to a flow condition set point and automatically controlling at least two of an engine speed, a pump displacement, and a lifting control valve to satisfy the flow condition set point. Additionally, the method may be staged to implement a first zone of control in which the lifting control valve is modulated to satisfy the required lifting speed while the engine speed is held at a constant minimum speed and the pump is held at a constant minimum displacement setting. A second zone of control may also be implemented in which the pump displacement is modulated to satisfy the required lifting speed while the engine speed is held at a constant minimum speed and the lifting control valve is held fully open. A third zone of control may also be engaged in which the engine speed is modulated to satisfy the required lifting speed while the pump is held at a maximum displacement setting and the lifting control valve is held fully open.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
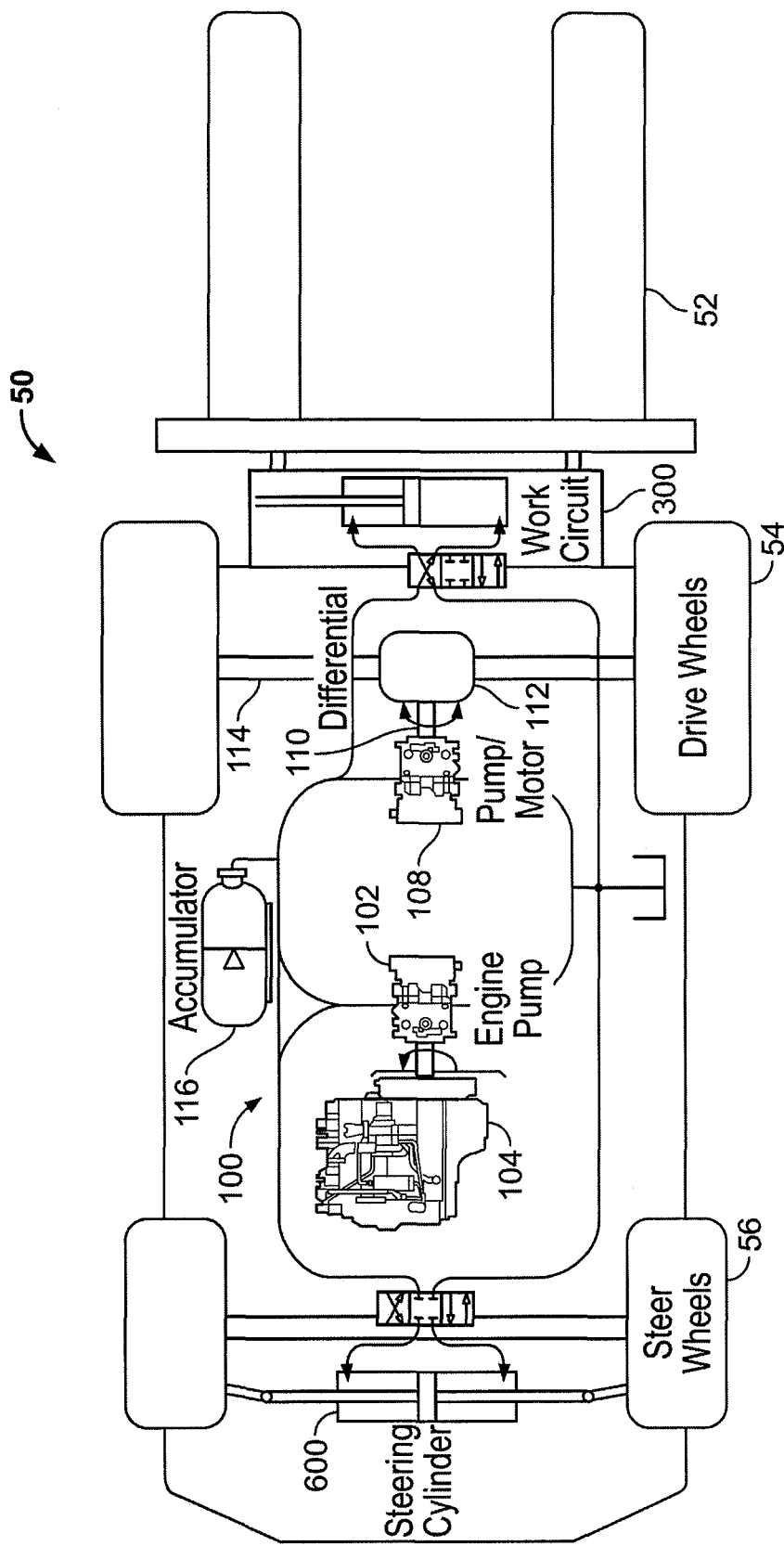
FIG. 1 is a schematic view of a work machine having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

General Description

As depicted at FIG. 1, a work machine 50 is shown. Work machine 50 includes a work attachment 52 for performing a variety of lifting tasks. In one embodiment, work machine 50 is a fork lift truck and work attachment 52 comprises two forks. However, one skilled in the art will appreciate that work attachment may be any hydraulically powered work implement.

Work machine 50 is also shown as including at least one drive wheel 54 and at least one steer wheel 56. In certain embodiments, one or more drive wheels 54 may be combined with one or more steer wheels 56. The drive wheels are powered by an engine 104 in fluid communication with pumps 102 and 108. Pump 102 is mechanically coupled to the engine 104 while pump 108 is connected to the engine 104 via a hydraulic system 100. Pump 108 is also mechanically coupled to the drive wheel(s) 54 via axles 114, differential 112, and drive shaft 110.

A work circuit 300 and a steering circuit 600 are also in fluid communication with the hydraulic system 100, as is an accumulator 116. The work circuit 300 actuates the work attachment 52 such that the lifting tasks can be performed while the steering circuit 600 allows for the work machine 50 to be selectively steered in a desired direction. The accumulator 116 operates to provide pressurized fluid to the hydraulic circuit 100 in the event that engine pump 102 is non-operative or is being used for a dedicated task. One such example is where the engine pump 102 is needed to operate the work circuit 300 exclusively in a primary work circuit mode of operation. In this case, the accumulator 116 can provide the necessary fluid power to operate the pump 108 and the steering circuit 600 until the work circuit mode of operation is no longer needed.

Main Hydraulic System Description

Figure 2:
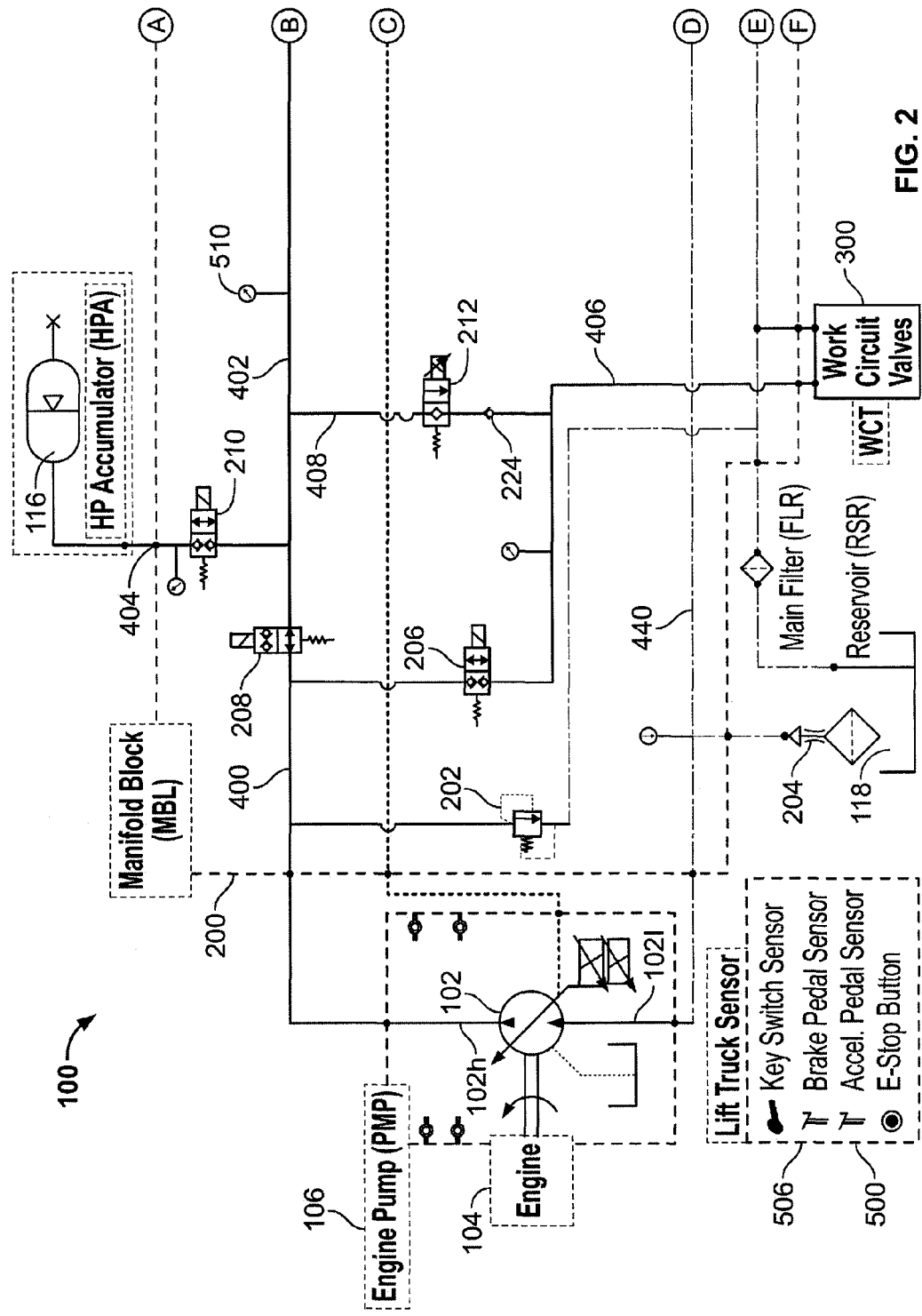
FIG. 2 is a schematic view of a hydraulic system for use with the work machine shown in FIG. 1.
Figure 2:
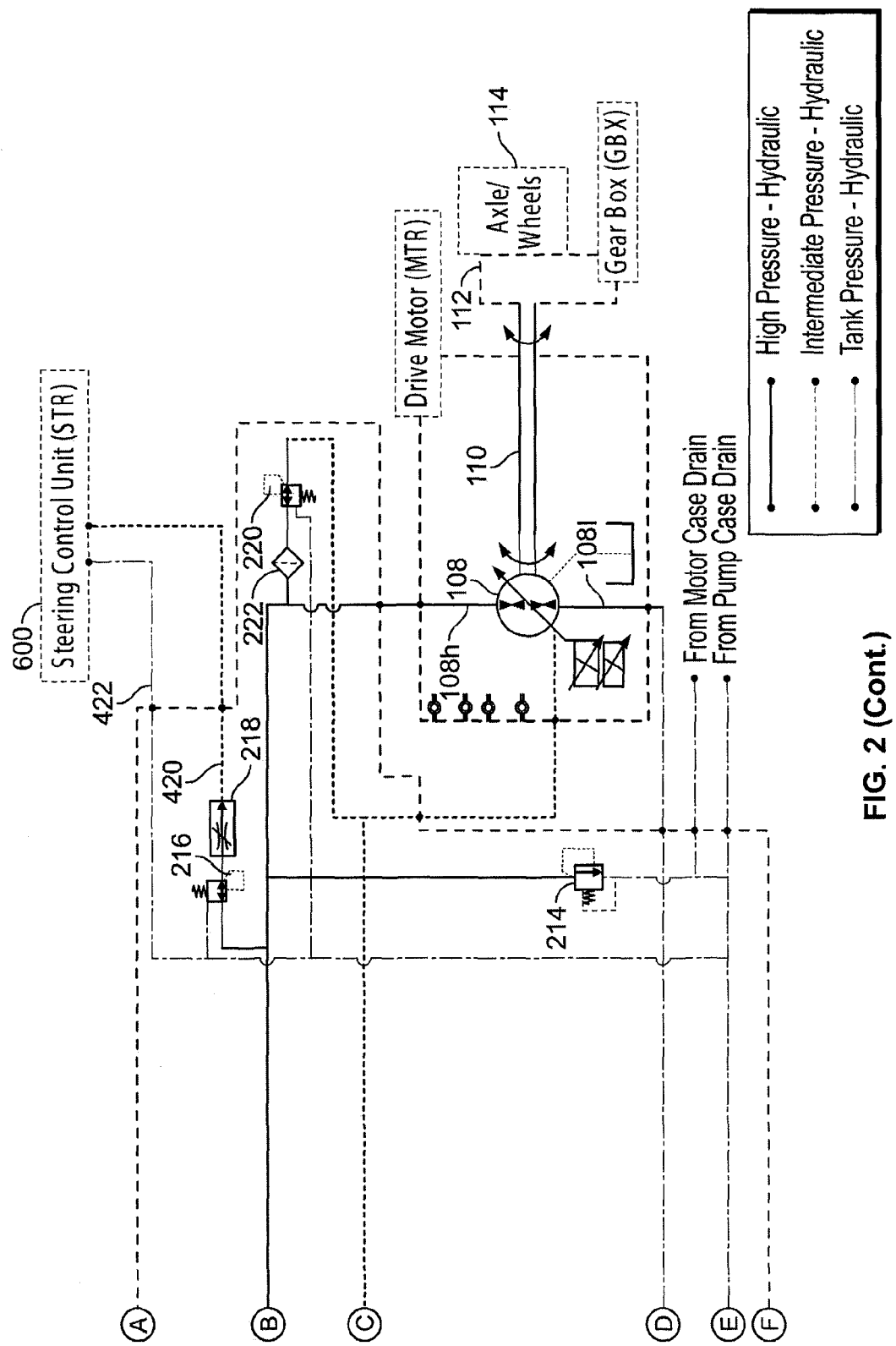

Turning now to FIG. 2, the hydraulic system 100 is illustrated as a schematic diagram. The hydraulic system 100 is powered by the prime mover 104 which is connected to a pump/motor 102. In certain embodiments, the pump/motor 102 may be replaced with a pump. As depicted, the hydraulic system 100 allows the hydraulic pump/motor 102 to be a single pump/motor (or a single pump) that powers the drivetrain 114, the work circuit 300, and/or the steering control unit 600. By configuring the hydraulic system 100 with the single pump/motor (or the single pump), a cost of the hydraulic system 100 may be reduced, a weight of the hydraulic system 100 may be reduced, and/or a packaging size of the hydraulic system 100 may be reduced. Furthermore, the efficiency of the system can be increased by reducing the parasitic losses of additional components that would otherwise be required.

As depicted, the hydraulic pump/motor 102 and the prime mover 104 may be assembled into an engine pump assembly 106. In certain embodiments, the prime mover 104 turns in a single rotational direction (e.g., a clockwise direction), and thus, the hydraulic pump/motor 102 may also rotate in the single rotational direction of the prime mover 104. Power may be transferred between the hydraulic pump/motor 102 and the prime mover 104 by a shaft (e.g., an input/output shaft of the hydraulic pump/motor 102 may be connected to a crankshaft of the prime mover 104). The power is typically transferred from the prime mover 104 to the hydraulic pump/motor 102 when the hydraulic pump/motor 102 is supplying hydraulic power to the hydraulic accumulator 116, the drivetrain 114, the work circuit 300, and/or the steering control unit 600. The power may be transferred from the hydraulic pump/motor 102 to the prime mover 104 when the hydraulic pump/motor 102 is starting the prime mover 104, during engine braking, etc. In certain embodiments, the system includes a single pump (e.g., only one pump, only one pumping rotating group, only one pump/motor, etc.).

The hydraulic pump/motor 102 may be a variable displacement pump/motor. The hydraulic pump/motor 102 may be an over-center pump/motor. The hydraulic pump/motor 102 includes an inlet 102*l* (i.e., a low pressure side) that receives hydraulic fluid from a tank 118 via a low pressure line 440, and the hydraulic pump/motor 102 includes an outlet 102*h* (i.e., a high pressure side) that is connected to a high pressure line 400 of the hydraulic pump/motor 102. When the prime mover 104 supplies power to the hydraulic pump/motor 102, hydraulic fluid is drawn from the tank 118 into the inlet 102*l* of the hydraulic pump/motor 102 and expelled from the outlet 102*h* of the hydraulic pump/motor 102 at a higher pressure. In certain embodiments, power may be delivered from the hydraulic pump/motor 102 to the prime mover 104 when a swash plate of the hydraulic pump/motor 102 is positioned over center and high pressure hydraulic fluid from the high pressure line 400 is driven backwards through the hydraulic pump/motor 102 and ejected to the low pressure line 440 and to the tank 118. Alternatively, a reversing valve of a hydraulic system can be used to cause the prime mover to be back driven with a hydraulic pump/motor, similar to the hydraulic pump/motor 102.

A flow control device 202 (e.g., a relief valve) includes a connection to the high pressure line 400. Upon hydraulic fluid pressure within the high pressure line 400 reaching a predetermined limit, the flow control device 202 opens and dumps a portion of the hydraulic fluid to the tank 118 and thereby protecting the high pressure line 400 from reaching an over pressure condition.

A flow control device 206 is connected between the high pressure line 400 and a high pressure line 406 of the work circuit 300. In the depicted embodiment, the flow control device 206 is a work circuit valve.

A flow control device 208 is connected between the high pressure line 400 and a high pressure line 402. As depicted, the high pressure line 402 may be connected to an inlet 108*h* (i.e., a high pressure side) of a pump/motor 108. The flow control device 208 may be an isolation valve. In certain embodiments, the flow control device 206 and the flow control device 208 may be combined into a single three-way valve.

The high pressure line 402 is connected to the hydraulic accumulator 116 by a fluid flow control device 210. In the depicted embodiment, the fluid flow control device 210 is an isolation valve for the hydraulic accumulator 116. In the depicted embodiment, the fluid flow control device 210 and the hydraulic accumulator 116 are connected by an accumulator line 404.

The high pressure line 402 is further connected to the high pressure line 406 by a flow control device 212 and another flow control device 224. In the depicted embodiment, the flow control device 212 is a work circuit valve, and the flow control device 224 is a check valve that prevents hydraulic fluid from the high pressure line 406 from entering the high pressure line 402. In the depicted embodiment, the flow control devices 212 and 224 are connected in series along a cross-over flow line 408 that connects the high pressure line 402 and the high pressure line 406. In other embodiments, a single flow control device may be used along the cross-over flow line 408.

Certain aspects of the propulsion system of the work machine 50 will now be described. The propulsion system includes the pump/motor 108 that both transmits and receives power to and from the drivetrain 114 via an output shaft 110. In particular, the output shaft 110 is connected to a gear box 112. The gear box 112 may include a differential connected to a pair of the drive wheels 54. Other drivetrains are also possible, for example where one motor drives a single wheel. When sending power to the drivetrain 114, the pump/motor 108 may accelerate the work machine 50, may move the work machine 50 up an incline, and/or may otherwise provide overall movement to the work machine 50. When the work machine 50 decelerates and/or travels down an incline, the pump/motor 108 may receive energy from the drivetrain 114. When the hydraulic system 100 is in the hybrid propel mode 84 or the work circuit primary mode 82, the pump/motor 108 may send hydraulic energy to the hydraulic accumulator 116. In particular, the pump/motor 108 may receive hydraulic fluid from the tank 118 via the low pressure line 440 and pressurize the hydraulic fluid and send it through the high pressure line 402 through the fluid flow control device 210 and the accumulator line 404 and into the hydraulic accumulator 116.

Figure 3:
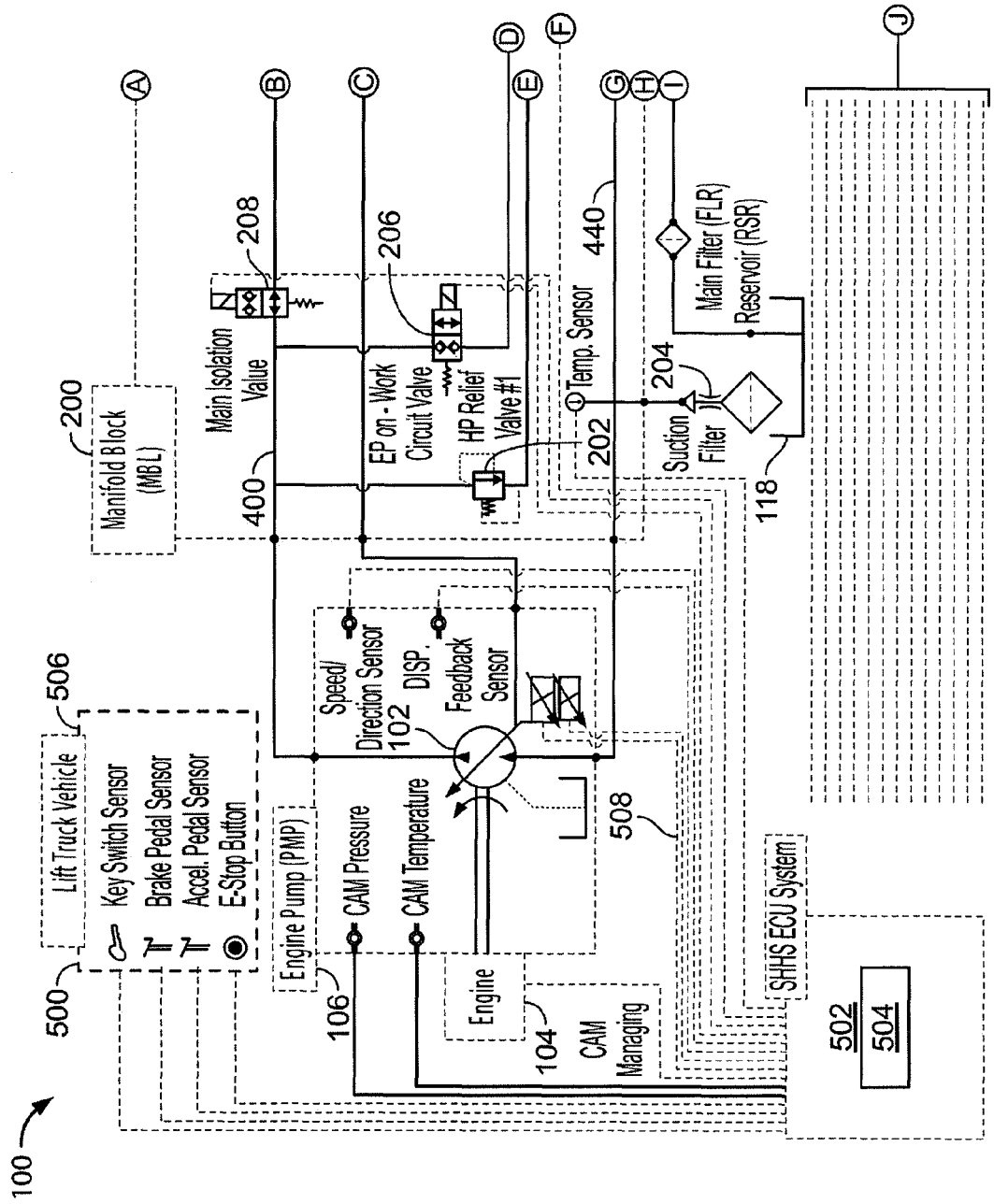
FIG. 3 is a schematic view of the hydraulic system shown in FIG. 2 with the addition of schematically shown controls components.
Figure 3:
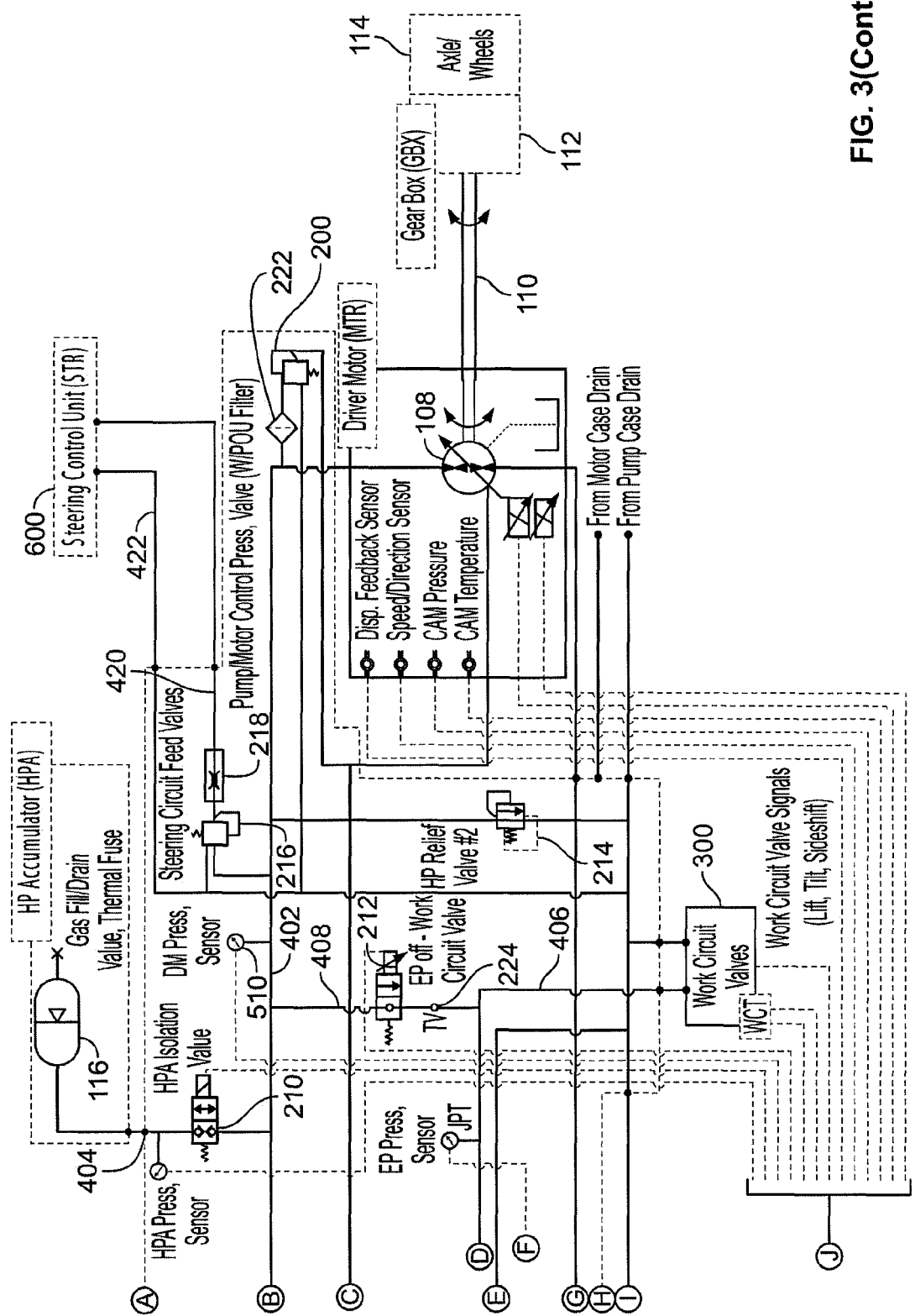

The pump/motor 108 may be driven by hydraulic power from the hydraulic accumulator 116 or the hydraulic pump/motor 102. In particular, when the hydraulic system 100 is in the work circuit primary mode 82, the pump/motor 108 receives the hydraulic power from the hydraulic accumulator 116, as illustrated at FIG. 3. When the hydraulic system 100 is in the hybrid propel mode 84, the pump/motor 108 may receive hydraulic power from either the hydraulic pump/motor 102, the hydraulic accumulator 116, or both the hydraulic pump/motor 102 and the hydraulic accumulator 116. When the hydraulic system 100 is in the hydrostatic mode 86, the pump/motor 108 receives power from the hydraulic pump/motor 102. However, the pump/motor 108 may deliver power to the hydraulic pump/motor 102 and the prime mover 104 may thereby provide engine braking.

A relief valve 214 may be connected between the high pressure line 402 and the tank 118. Feedback from the high pressure line 402 may be given to the hydraulic pump/motor 102 by way of a pump/motor control pressure valve 220. In particular, a device 222 is connected between the high pressure line 402 and the pump/motor control pressure valve 220. The pump/motor control pressure valve 220 may feed a pressure signal to the hydraulic pump/motor 102 and thereby control the hydraulic pump/motor 102 in certain embodiments and/or in certain modes.

In the depicted embodiment, the steering control unit 600 receives hydraulic power from the high pressure line 402. In particular, an intermediate pressure steering line 420 is connected to the high pressure line 402 via a steering feed valve 218 and a steering feed valve 216. A return line 422 is connected between the steering control unit 600 and the tank 118.

Various components may be included in a manifold block 200. For example, the flow control device 202, the flow control device 206, the flow control device 208, the fluid flow control device 210, the flow control device 212, the relief valve 214, the pump/motor control pressure valve 220, the device 222, and/or the flow control device 224 may be included in the manifold block 200.

Turning now to FIG. 3, a schematic diagram of the control system 500 is shown with a schematic diagram of the hydraulic system 100. As can be seen, the hydraulic system 100 monitors a plurality of sensors indicating the state of the hydraulic system 100. The control system 500 further monitors the operator interface 506 thereby allowing an operator to take control of the hydraulic system 100 and thereby take control of the work machine 50. The electronic control unit 502 of the control system 500 may perform calculations that model the hydraulic system 100 in the various modes and thereby determine the optimal mode and thereby select the optimal mode for the given working conditions and the given operator input. Under certain conditions, the mode of the hydraulic system 100 is selected to maximize fuel efficiency of the work machine 50. In other conditions, the mode of the hydraulic system 100 is selected to maximize performance of the hydraulic system 100 and thereby the work machine 50. The electronic control unit 502 may learn a working cycle that the work machine 50 repeatedly undertakes. By learning the working cycle, the electronic control unit 502 can maximize efficiency for the working cycle and identify when the work machine 50 is in the working cycle. The electronic control unit 502 may switch modes differently depending on which working cycle the work machine 50 is in. By switching modes throughout the working cycle, various parameters of the hydraulic system 100 can be optimized for efficiency or performance. For example, charge pressure of the hydraulic accumulator 116, swash plate angle of the hydraulic pump/motor 102 and/or the pump/motor 108, and/or the timing of starting and stopping the prime mover 104 may be determined based on the working cycle of the work machine 50. The control system 500 may emulate a conventional work machine such that the work machine 50 behaves and feels like the conventional work machine to the operator.

Figure 4:
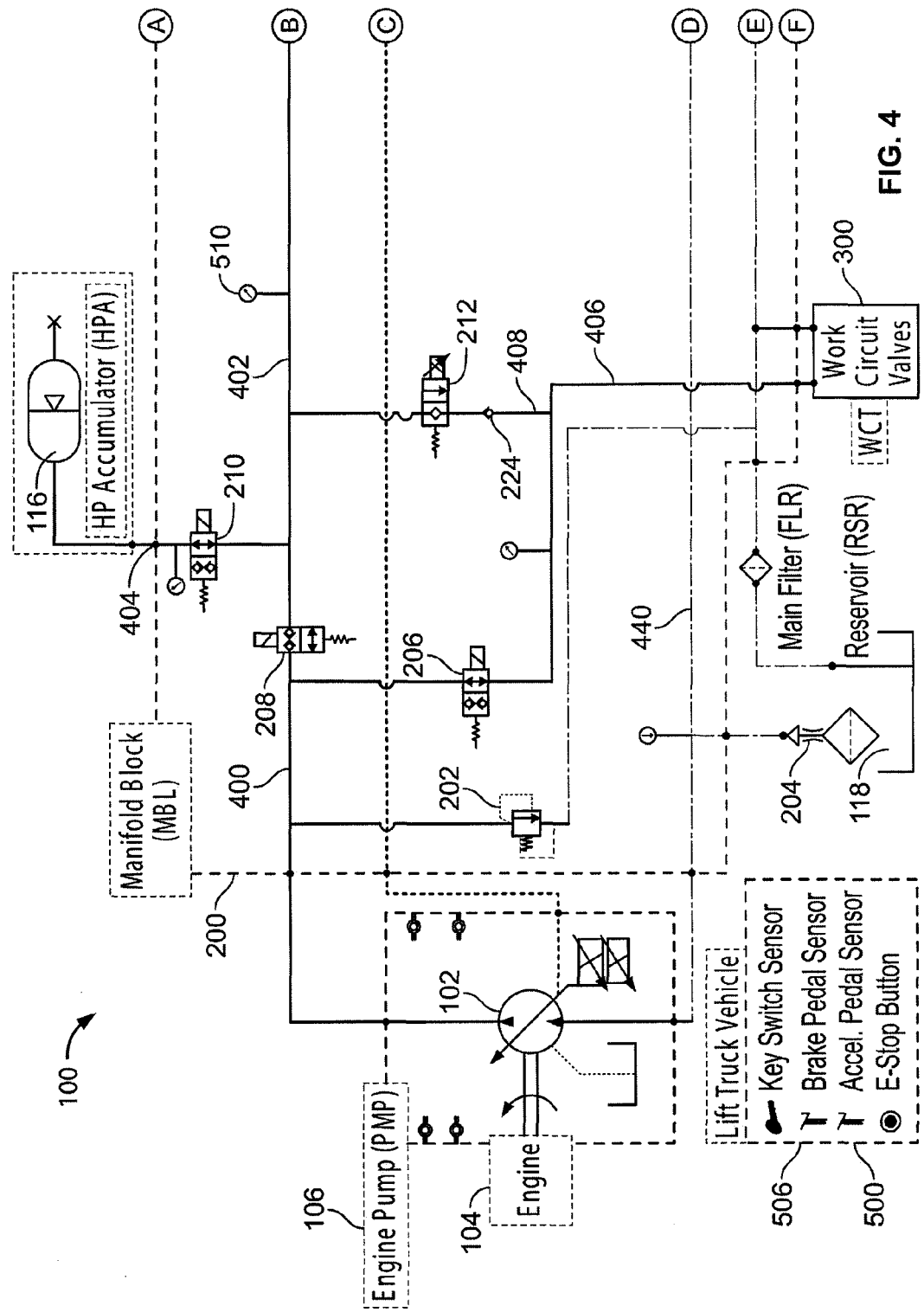
FIG. 4 is a schematic view of the hydraulic system shown in FIG. 2 with the system in a work circuit primary mode.
Figure 4:
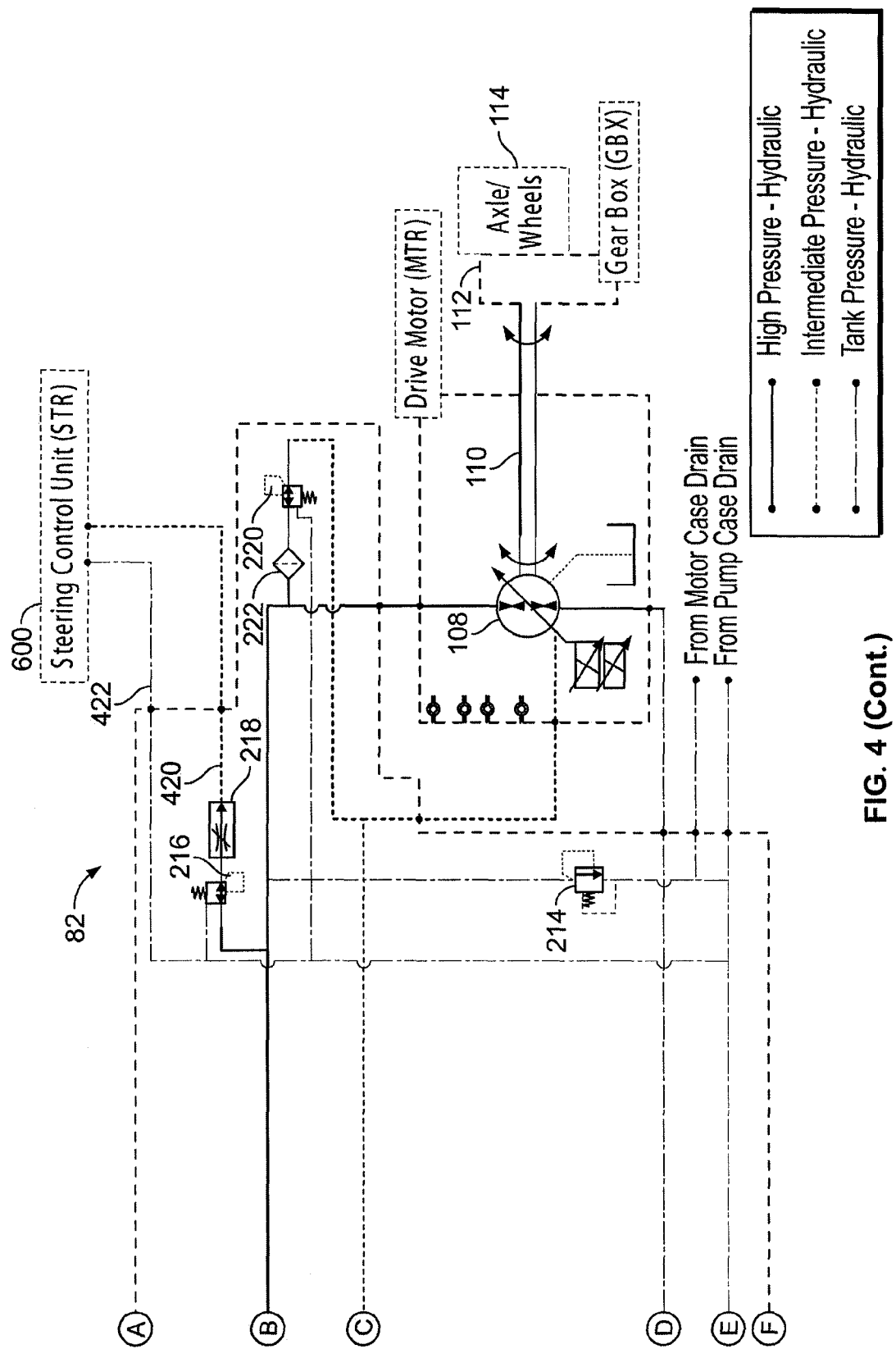

Turning now to FIG. 4, the work circuit primary mode 82 is illustrated. The work circuit primary mode 82 is selected by the control system 500 when the work attachment 52 is under heavy use, sustained use, and/or use that requires high volumetric flow rates of hydraulic fluid. The drivetrain 114 of the work machine 50 is operational in the work circuit primary mode 82. In particular, the hydraulic accumulator 116 can supply power to and receive power from the pump/motor 108. Upon the hydraulic accumulator 116 being depleted to a given level, the control system 500 may quickly switch the hydraulic system 100 into the hybrid propel mode 84 to recharge the hydraulic accumulator 116. Upon the hydraulic accumulator 116 being recharged to a given pressure level, the control system 500 may return the hydraulic system 100 to the work circuit primary mode 82.

Work Circuit Description

Figure 5:
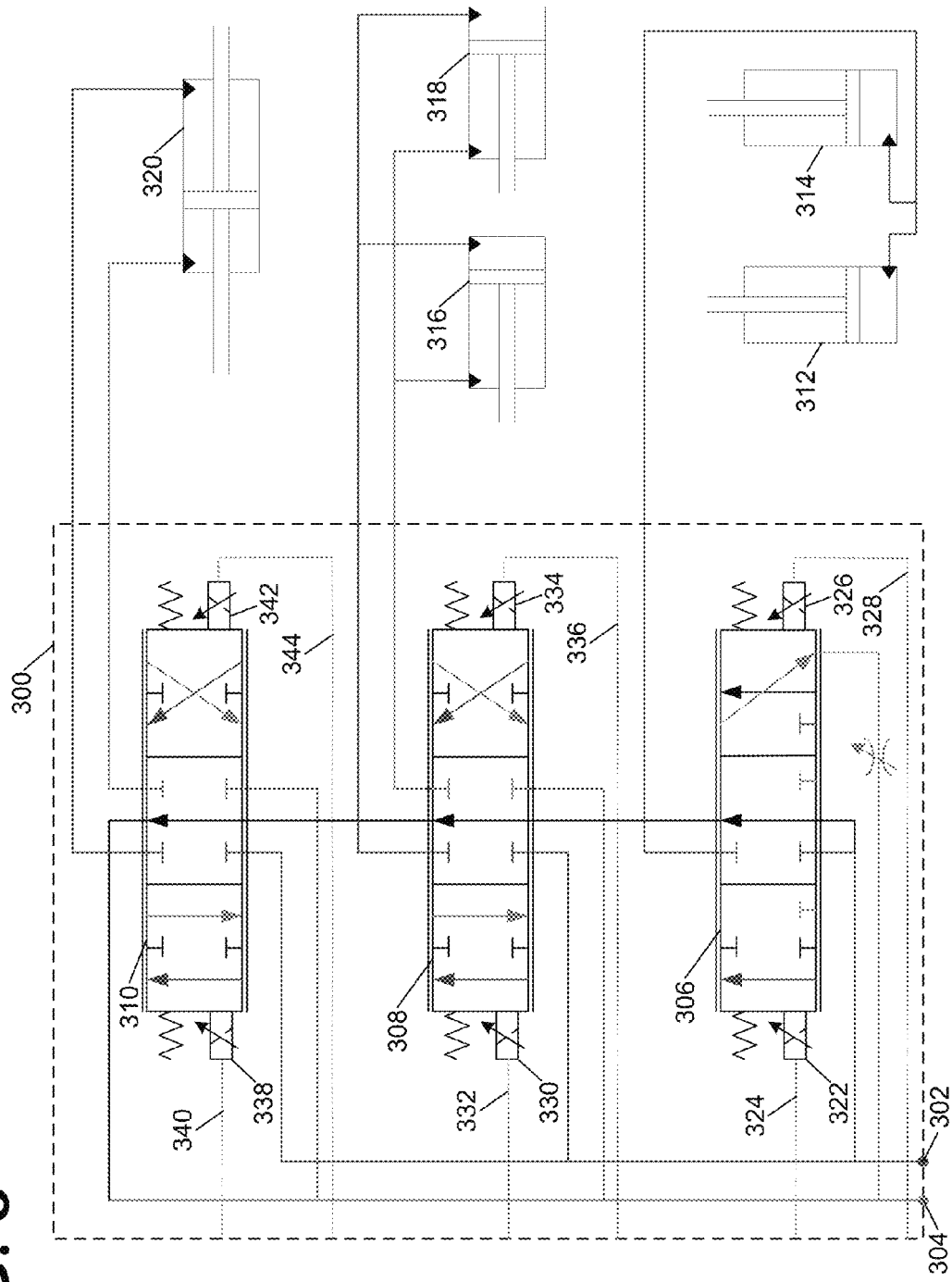
FIG. 5 is a schematic view of a work circuit usable with the hydraulic system shown in FIG. 2.
Figure 5A:
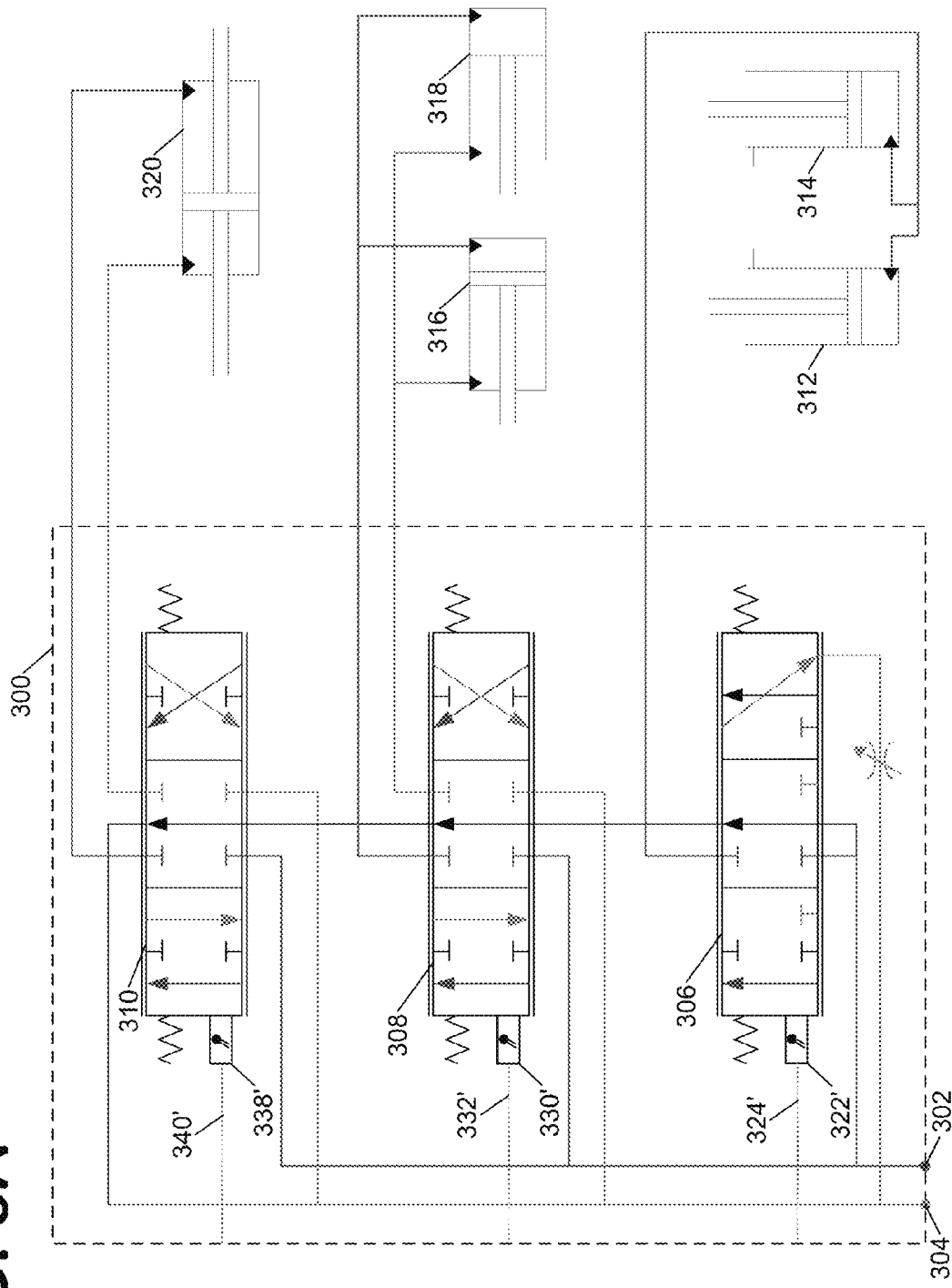
FIG. 5A is a schematic view of a second embodiment of a work circuit usable with the hydraulic system shown in FIG. 2.

Referring to FIGS. 5 and 5A, examples of a work circuit 300 is shown. Work circuit 300 is for activating the work attachment 52 of the work machine 50. In the embodiment shown, the work circuit 300 has a pump port 302 for connecting to pump 102 via pumped fluid line 406. Work circuit 300 also has a tank port 304 for connecting to the reservoir or tank 118.

Work circuit 300 also includes a first valve 306 for enabling a work attachment lift function, a second valve 308 for enabling a work attachment tilt function, and a third valve 310 for enabling a work attachment side shift function. In the particular embodiment shown, valves 306, 308, 310 are proportional valves of the spool and sleeve type.

The first valve 306 is configured and arranged to selectively provide pressurized fluid from port 302 to one or multiple hydraulic lift cylinders 312, 314 which are mechanically coupled to the work attachment 52. The operation of valve 306 causes the work attachment 52 to be selectively raised or lowered in a lifting function. The lifting speed of the lift cylinders 312, 314 is a result of the flow through the valve 306. Flow through the valve 306 can be controlled by a pair of variable solenoid actuators 322, 326 acting on each end of the spool of the valve 306. The variable solenoid actuators 322, 326 can be operated by the control system 500 via control lines 324, 328, respectively. As shown in FIG. 5A, valve 306 can be mechanically linked to a lever 322' with an analog positioner in communication with the controller via control line 324'.

The second valve 308 is configured and arranged to selectively provide pressurized fluid from port 302 to one or both of hydraulic tilt cylinders 316, 318 which are mechanically coupled to the work attachment 52. The operation of valve 308 causes the work attachment 52 to be selectively tilted forward and backward in a tilting function. Flow through the valve 308 can be controlled by a pair of variable solenoid actuators 330, 334 acting on each end of the spool of the valve 308. The variable solenoid actuators 330, 334 can be operated by the control system 500 via control lines 332, 336, respectively. As shown in FIG. 5A, valve 308 can be mechanically linked to a lever 330' with an analog positioner in communication with the controller via control line 332'.

The third valve 310 is configured and arranged to selectively provide pressurized fluid from port 302 to a side shift hydraulic cylinder 320 which is mechanically coupled to the work attachment 52. The operation of valve 310 causes the work attachment 52 to be selectively moved from side to side in a side shift function. Flow through the valve 310 can be controlled by a pair of variable solenoid actuators 338, 342 acting on each end of the spool of the valve 310. The variable solenoid actuators 338, 342 can be operated by the control system 500 via control lines 338, 342, respectively. As shown in FIG. 5A, valve 310 can be mechanically linked to a lever 338' with an analog positioner in communication with the controller via control line 340'.

Electronic Control System

The hydraulic system 100 operates in various modes depending on demands placed on the work machine 50 (e.g., by an operator). A control system 500 monitors an operator interface 506 of the work machine 50, and also monitors various sensors and operating parameters of the hydraulic system 100. The control system 500 evaluates input received from the operator interface 506.

An electronic control unit 502 monitors various sensors 510 and operating parameters of the hydraulic system 100 to configure the hydraulic system 100 into the most appropriate mode. The modes include a work circuit primary mode, as illustrated at FIG. 4, a hybrid propel mode (not shown) and a hydrostatic mode (not shown). The electronic control unit 502 may monitor the operator interface 506, the prime mover 104, and environmental conditions (e.g. ambient temperature). In the work circuit primary mode, the pump 102 directly supplies fluid power to the work circuit 300 via the operation of valve 206 and 208 while the drive and steering systems are isolated from the pump 102 and instead powered by the accumulator 116.

Figure 6:
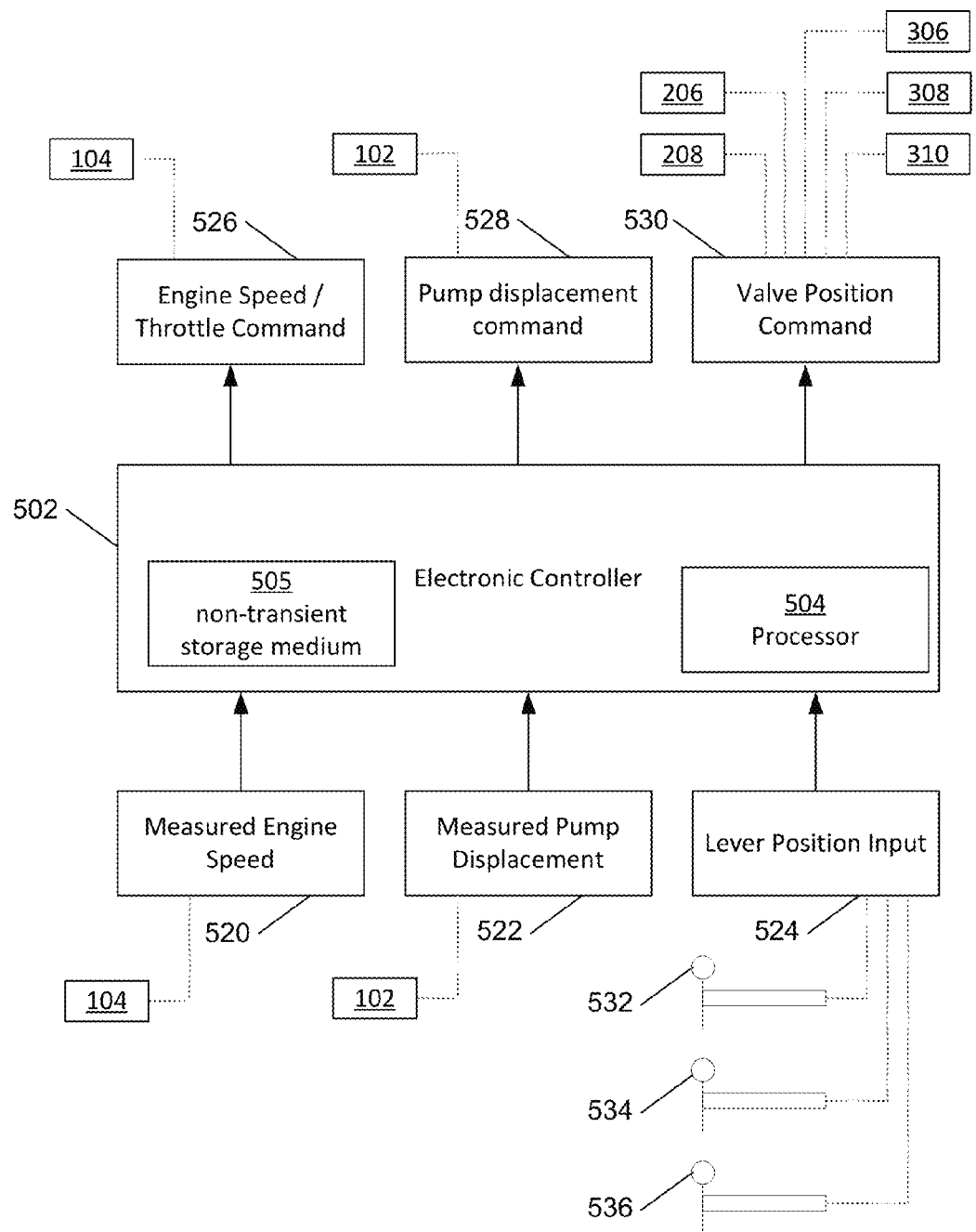
FIG. 6 is a schematic of an electronic control system for the hydraulic system shown in FIG. 2.

Referring to FIG. 6, the electronic control unit 502 is schematically shown as including a processor 505 and a non-transient storage medium or memory 504, such as RAM, flash drive or a hard drive. Memory 504 is for storing executable code, the operating parameters, the input from the operator interface while processor 505 is for executing the code. Electronic control unit 502 is also shown as having a number of inputs and outputs that may be used for implementing the work circuit primary mode. One of the inputs is the measured engine speed 520. Measured engine speed 520 may be a direct input into the electronic control unit 502 or may be received from another portion of the control system via a control area network (CAN). Another input is the measured pump displacement 522. The measured pump displacement 522 may be, for example, a displacement feedback sensor of pump 102, as shown in FIG. 3.

Another input into the electronic control unit 502 is the lever position input 524. The lever position input may be a signal from a positioner on a hydraulic lever, as shown in FIG. 5A, or may be a direct digital signal from an electronic lever as shown in FIGS. 5 and 6. Additionally, multiple lever position inputs are possible. Examples are: the position of a lifting lever 532 relating to the lifting cylinders 312/314, the position of a tilt lever 534 relating to the tilt cylinders 316/318, and the position of a side shift lever 536 relating to the side shift cylinder 320. In the particular embodiment shown, the lever position input 524 is an input from a lever having an electronic output that is associated with the hydraulic lifting cylinders 312, 314 and the control valve 306.

Still referring to FIG. 6, a number of outputs from the electronic control unit 502 are shown. One output is an engine speed/throttle command signal 526. This output may be provided directly to the engine, or may be communicated to another portion of the vehicle control system over the CAN. Another output is the pump displacement command 528 which is for adjusting the output of the pump 102, for example by adjusting the angle of the swash plate in a variable displacement axial piston pump. Yet another output is the valve command output 530. Multiple valve command outputs may be provided to control each of valves 306, 308, 310 via control lines 324/328, 332/336, and 340/344, respectively. In the particular embodiment shown, the valve command output 530 is a proportional signal to the solenoid valves 322/326 of control valve 306 via control lines 324/328. Additionally, electronic control unit 502 can output valve position commands to valves 206/208 to enable the primary work circuit mode by diverting all flow from pump 102 to the work circuit 300.

The electronic control unit 502 may also include a number of maps or algorithms to correlate the inputs and outputs of the control unit 502. For example, the control unit 502 may include an algorithm to correlate the measured engine speed input to a calculated pump rotational speed. Likewise, the calculated pump rotational speed and the measured pump displacement 522 may be used together to derive a calculated pump flow condition. The position of the valve 306 can also be determined from the valve command output 530, or alternatively from a positioner on the valve, as shown in FIG. 5A. Taken together, the measured engine speed 520, the measured pump displacement 522, and the valve command 530 can be used to determine the total calculated hydraulic fluid flow to each of the cylinders 312/314, 316/318, and 320 connected to the work attachment 52.

Figure 9:
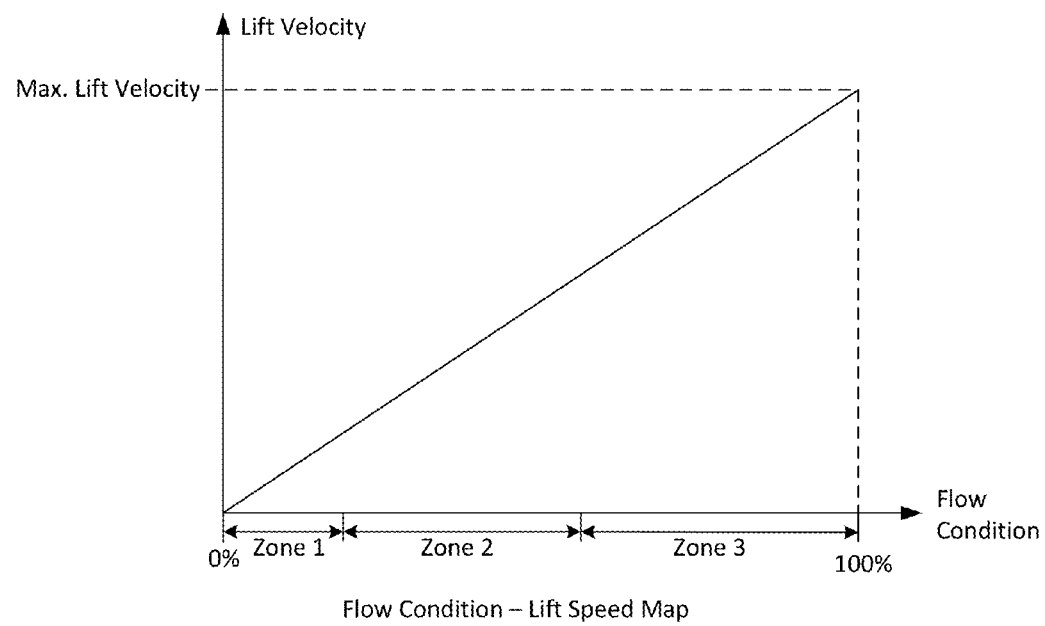
FIG. 9 is a mapping diagram relating to the process flow charts of FIGS. 7 and 8 and correlating a flow condition of the hydraulic system with the lift speed set point.

Referring to FIG. 9, a map is shown that may be incorporated within the electronic control unit 502 that provides a correlation between the flow condition to lifting cylinders 312/314 and the lifting velocity of the work attachment.

Because hydraulic fluid is relatively incompressible, the velocity of the work attachment 52 can be correlated to the calculated hydraulic fluid flow to each of the cylinders connected to the work attachment 52. Where only one of the three valves is being used, the correlation only needs to account for the flow through the operative valve. Where multiple valves are used at a single time, additional maps or algorithms may be utilized to ascertain the flow rate through, for example, the lifting cylinders 312/314. Alternatively, the velocity could be correlated to an actually measured fluid flow at each hydraulic cylinder, or could be directly measured through the use of positioners and/or accelerometers on the work attachment 52 or elsewhere on work machine 50.

In general terms, an operator of the work machine 50 will be most concerned with maintaining a desired or required lifting speed of the work attachment 52. As such, the flow through the lifting cylinders 312/314 and the control valve 306 are usually of primary importance. Where this is the case, the electronic control unit 502 may be configured to operate the system to ensure that the desired or required lifting speed is maintained. The operator of the work machine 50 can give an indication of the desired lifting speed by moving the lifting lever to any point between an initial position in which no lifting velocity is desired to a maximum position where a maximum lifting velocity is desired.

Figure 10:
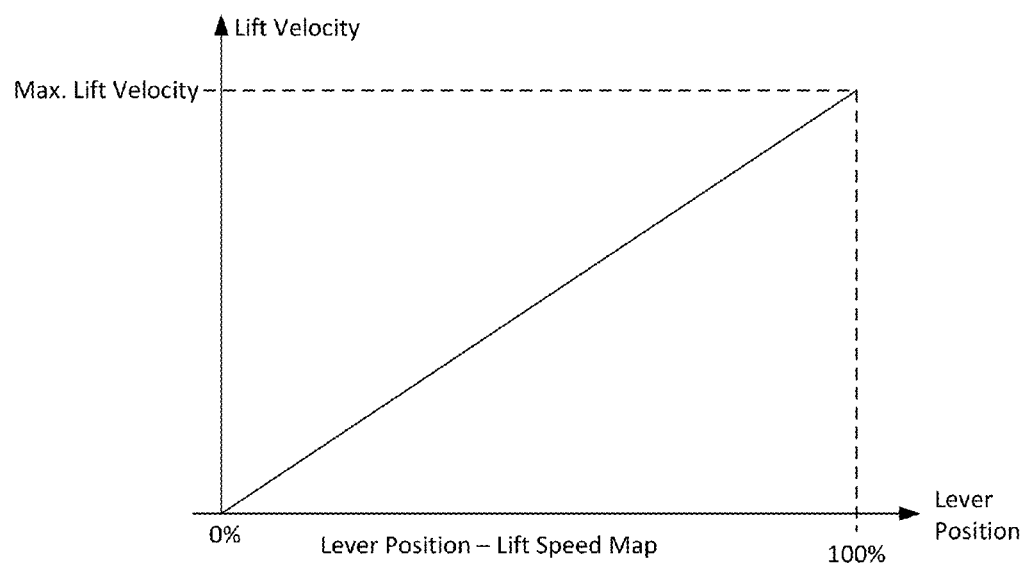
FIG. 10 is a mapping diagram relating to the process flow charts of FIGS. 7 and 8 and correlating a lever position of the hydraulic system with a lift speed set point.

In order to correlate the desired lifting velocity indicated by the user to the measured system parameters, a map or algorithm may be incorporated into the electronic control unit 502. One such example of a map is shown in FIG. 10 which directly correlates the lifting speed of the work attachment 52 to the lever position input 524. By utilizing the maps of FIGS. 9 and 10 (or analogous algorithms), the electronic control unit 502 can selectively command the engine speed 526, the pump displacement 528, and the valve position 530 together such to meet the lifting speed required by the lever position input 524.

Method of Operation

Figure 7:
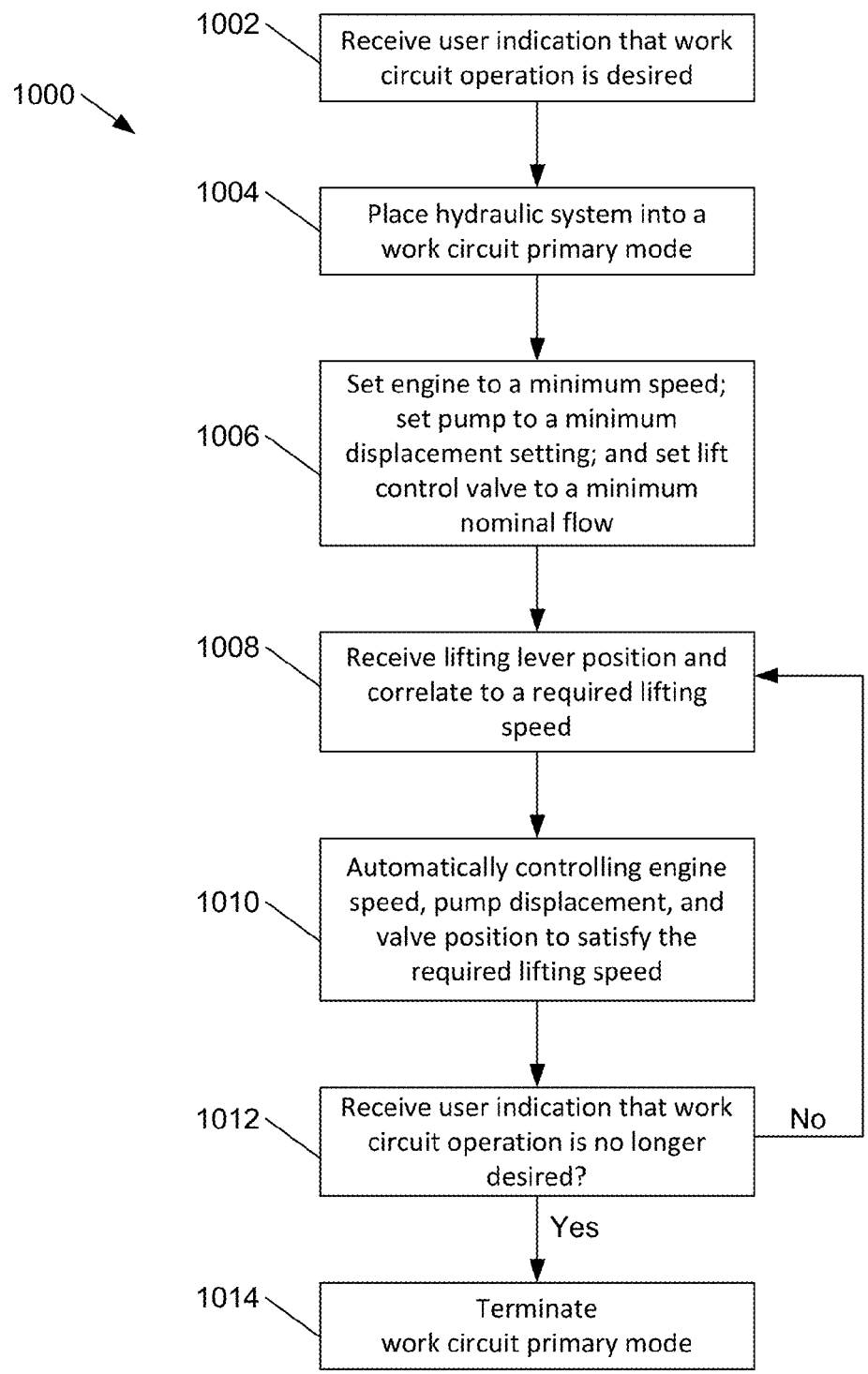
FIG. 7 is a process flow chart showing a method of operation of the work circuit shown in FIG. 4 in conjunction with the hydraulic system shown in FIG. 2.
Figure 8:
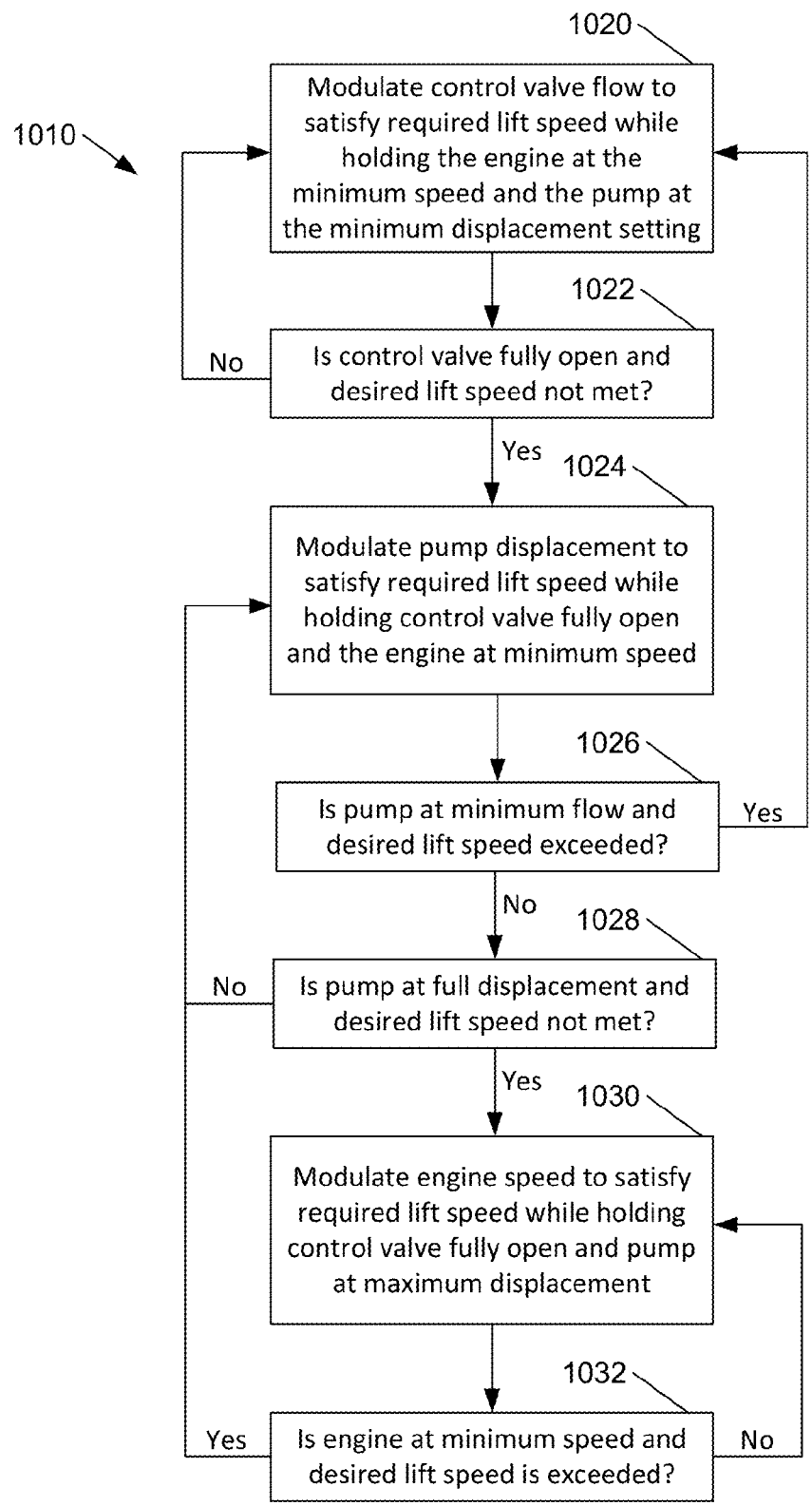
FIG. 8 is a process flow chart showing further detail of the process flow chart shown in FIG. 7.

Referring to FIGS. 7 and 8, a method 1000 of operating the work circuit 300 is shown. It is noted that although FIGS. 7 and 8 diagrammatically show the method steps in a particular order, the method is not necessarily intended to be limited to being performed in the shown order. Rather at least some of the shown steps may be performed in an overlapping manner, in a different order and/or simultaneously.

In a first step 1002 of the method 1000, the electronic control unit 502 receives an indication from the user that the work circuit primary mode of operation is desired. This indication may come from a variety of user inputs. For example, the user may move one of the levers 532, 534, 536 associated with the work circuit. Another example is the user selecting the mode directly or indirectly through the use of the user interface 506 of the control system 500.

In a second step 1004, the hydraulic system 100 is placed in the work circuit primary mode. As stated above, the work circuit primary mode is the mode in which the pump 102 is solely responsible for providing fluid power to the work circuit 300. In the embodiment shown, step 1004 is accomplished by controlling valve 206 to an open position and valve 208 to a closed position, as illustrated in FIG. 3. As shown, the positioning of the valves 206/208 isolates the drive system and steering systems from the pump 102 and places the work circuit 300 in fluid communication with the pump 102. It is noted that vales 206, 208 could be a single three-way valve as well. Furthermore, it is noted that some systems may not require isolation from the remainder of the hydraulic system and that step 1004 may not be necessary and/or it may be unnecessary to isolate the work circuit from the remainder of the drive system. Such as case exists in hydrostatic applications where a separate pump is provided for the work circuit and with clutch operated torque converter automatic transmissions.

In a third step 1006, the engine 104 is set to a minimum speed, the pump 102 is set to a minimum displacement setting, and the lifting control valve 306 is set to a minimum nominal flow. This step may not be necessary to the extent that any of the aforementioned components is already at this position. Step 1006 ensures that the work circuit is at a minimum operating state prior to engaging in a work task.

In a fourth step 1008, a lifting lever position is received by the electronic control unit 502 from the lifting lever input 532. As stated before, the lifting lever position is correlated to a required lifting velocity of the work attachment 52 via algorithms or a map, such as that shown in FIG. 10.

In a fifth step 1010, the engine speed, pump displacement, and lifting valve position are automatically controlled to maintain the required lifting speed, or a correlated set point, based on the lifting lever position. By use of the term "automatically controlled" it is meant to define the control of the engine, pump, and control valve as being controlled by the control system 500. This is in contrast to manual control wherein an operator is directly controlling the engine speed, pump displacement and/or control valve position. The automatic operation of the disclosed system allows for the entire lifting process to be controlled by a single input from the operator. This is a significant improvement over prior art systems that require an operator to simultaneously and directly modulate a lifting lever and the accelerator pedal in order to achieve a desired lift speed. Furthermore, many prior art systems also require an operator to concurrently operate a brake pedal or the clutch pedal (to put engine in neutral) to prevent the work machine from creeping forward during the lifting operation. As such, the disclosed system and operation allow an operator to provide a single input into the work machine rather than three when lifting the work attachment 52.

In one embodiment, the required lifting speed is correlated to a flow condition set point of the hydraulic lifting cylinders 312, 314. As stated before, the set flow condition set point can be derived from algorithms or maps (e.g. the maps of FIGS. 9 and 10) that correlate engine speed (or pump speed), pump displacement, and the lifting control valve position. In one embodiment, the flow condition is directly measured. In yet another embodiment, the set point is the required lifting velocity indicated by the lifting lever position as measured by position sensors and/or accelerometers. During this step, the electronic control unit 502 can also implement an anti-stall algorithm to increase engine speed and/or decrease pump displacement to prevent the engine 104 from stalling under heavier loads.

During execution of the fifth step 1010, the engine, pump, and valve may be staged to modulate between minimum and maximum operating points together sequentially, simultaneously, or in overlapping fashion. For example, and as described later in more detail, the valve may first modulate from its minimum nominal flow to a maximum flow in a first zone of operation followed by the pump being increased from minimum to a maximum displacement in a second zone of operation. If the valve at full open and the pump at full displacement are unable to maintain the flow condition set point, then a third zone of operation can be implemented in which the engine speed is modulated from the minimum to the maximum speed. FIG. 9 shows each of these stages as Zone 1, Zone 2, and Zone 3, respectively. Although the zones and components may be controlled or staged in any order, it is believed that the above described order leads to a more desirable operation in as much as the control valve can provide for finer control at low velocities while controlling pump displacement is suitable for intermediate speeds. Controlling engine speed at higher lifting speed conditions is also preferable.

In all embodiments, the fourth and fifth steps 1008, 1010 are continuously performed such that the operator can satisfactorily operate and position the work attachment 52 until an indication is received that the work circuit primary mode is no long desired in a step 1012. The operator may either deselect the work circuit primary mode directly via the user interface 506 or other means, or the work circuit primary mode may be terminated after a certain time period has passed without use. The work circuit primary mode may also be configured to terminate upon the activation of other critical functions of work machine 50. A final step in the process 1000 is the termination of the work circuit primary mode 1014.

Referring to FIG. 8, an example is provided showing how the fifth step 1010 may be accomplished. As stated previously, many other approaches may be utilized.

In a step 1020 the lifting control valve is modulated to satisfy the desired lift speed while holding the engine at a constant minimum speed and the pump at a constant minimum displacement setting. This is the previously identified first zone of control. The control valve may be modulated anywhere between a minimum position (e.g. zero flow) to a maximum position during step 1020. In a step 1022, it is determined whether a condition exists in which the control valve has reached its maximum position and the required lift speed has still not been met. In one embodiment, this determination is made by comparing the required lift velocity based on the lever position (FIG. 10) to the actual lift velocity based on the flow condition to the hydraulic cylinders (FIG. 9). In one embodiment, the maps of FIGS. 9 and 10 are used together to define a flow condition set point against which the control valve may be modulated. Steps 1020 and 10223 are continuously repeated as long as the desired lift speed can be met by modulating the control valve.

Where the desired lift speed can no longer be maintained through the operation of the control valve alone, a step 1024 may be implemented. This is the previously identified second zone of control. It is noted that step 1024 (and following steps 1026, 1028) may not be used or necessary where a fixed displacement pump is in used. In step 1024, the control valve is held in the fully open maximum condition while the engine speed remains at its constant minimum speed position. However, the pump is modulated to anywhere between a minimum displacement setting and a maximum displacement setting in order to satisfy the desired lift speed or correlated flow condition set point in a manner similar to that described for step 1020.

In a step 1026, it is determined whether the pump is at its minimum displacement and the required lift speed is exceeded. If this is the case, the process returns to step 1020 wherein the control valve again becomes responsible for the lift speed control. In a step 1028, it is determined whether a condition exists in which the pump is at its maximum displacement and the desired lift speed has still not been met. Where the pump is able to modulate and satisfy the lift speed requirements, the process will continuously loop through steps 1024-1026. Where the lift speed cannot be satisfied by a fully open control valve and a pump at full displacement, a step 1030 is implemented.

In a step 1030, the control valve is held fully open and the pump is held at full displacement while the engine is modulated to maintain the required lift speed, as indicated by the lever position. This is the previously identified third zone of control. The engine speed may be modulated anywhere between its minimum and maximum speed settings. Step 1030 is active until the engine speed is modulated to its minimum speed setting and the lift speed is exceeded. This determination is made at a step 1032. At this point, the process is returned to step 1024 where the pump can be modulated for lift speed control.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A method for operating a work attachment of a work machine with a single input, the method comprising:
   (a) receiving a lifting lever position input and correlating the lifting lever position input to a required lifting speed; and
   (b) automatically controlling at least two of an engine speed, a pump displacement, and a lifting control valve to satisfy the required lifting speed, wherein the step of automatically controlling includes a first zone of control in which the lifting control valve is modulated to satisfy the required lifting speed while the engine speed is held at a constant minimum speed and the pump is held at a constant minimum displacement setting.

2. The method of claim 1, wherein the step of includes correlating the lifting lever position to a required lifting speed further includes correlating the required lifting speed to a flow condition set point and wherein the step of automatically controlling further includes automatically controlling at least two of an engine speed, a pump displacement, and a lifting control valve to satisfy the flow condition set point.

3. The method of claim 1, wherein the step of automatically controlling includes a second zone of control in which the pump displacement is modulated to satisfy the required lifting speed while the engine speed is held at a constant minimum speed and the lifting control valve is held fully open.

4. The method of claim 3, wherein the step of automatically controlling includes a third zone of control in which the engine speed is modulated to satisfy the required lifting speed while the pump is held at a maximum displacement setting and the lifting control valve is held fully open.

5. The method of claim 4, wherein the first, second, and third zones of control are implemented sequentially from the first zone of control to the third zone of control in order to satisfy the lifting speed requirement.

6. The method of claim 5, wherein the system is placed from the first zone of control to the second zone of control when the control valve is fully open and the required lifting speed has not been achieved.

7. The method of claim 5, wherein the system is placed from the second zone of control to the third zone of control when the pump is at maximum displacement and the required lifting speed has not been achieved.

8. The method of claim 5, wherein the system is placed from the third zone of control to the second zone of control when the engine is at a minimum speed and the required lifting speed has been exceeded.

9. The method of claim 5, wherein the system is placed from the second zone of control to the first zone of control when the pump displacement is at a minimum setting and the required lifting speed is exceeded.

10. The method of claim 1, further comprising the steps of:
    (a) receiving an indication that operation of a work circuit in a hydraulic system associated with the work attachment is to be activated; and
    (b) placing the hydraulic system in a work circuit primary mode in which a pump in the hydraulic system is placed in fluid communication with the work circuit and in which the pump is isolated from a drive circuit of the hydraulic system prior to the step of automatically controlling.

11. A method for operating a work attachment of a work machine with a single input, the method comprising:
    (a) receiving a lifting lever position input and correlating the lifting lever position input to a required lifting speed; and
    (b) automatically controlling at least one of an engine speed, a pump displacement, and a lifting control valve to satisfy the required lifting speed, wherein the step of automatically controlling includes a first zone of control in which the lifting control valve is modulated to satisfy the required lifting speed while the engine speed is held at a constant minimum speed and the pump is held at a constant minimum displacement setting.

12. The method of claim 11, wherein the automatically controlling step includes controlling the engine speed.

13. The method of claim 12, wherein the lifting lever is hydraulically connected to the lifting control valve.

* * * * *